United States Patent [19]
Bossen et al.

[11] Patent Number: 5,380,998
[45] Date of Patent: Jan. 10, 1995

[54] SINGLE WIDTH BAR CODE WITH END CODE PROVIDING BIDIRECTIONALITY

[75] Inventors: Douglas C. Bossen, Austin, Tex.; Chin-Long Chen, Fishkill, N.Y.; Mu-Yue Hsiao, Poughkeepsie, N.Y.; James M. Mulligan, Poughquag, N.Y.

[73] Assignee: International Business Machines Corporation, Armonk, N.Y.

[21] Appl. No.: 72,260

[22] Filed: Jun. 3, 1993

Related U.S. Application Data

[63] Continuation of Ser. No. 568,302, Aug. 15, 1990, abandoned.

[51] Int. Cl.⁶ ............................................. G06K 19/06
[52] U.S. Cl. ...................................................... 235/494
[58] Field of Search ................ 235/463, 466, 494, 474

[56] References Cited

U.S. PATENT DOCUMENTS

| | | |
|---|---|---|
| 3,731,064 | 5/1973 | Berler et al. |
| 3,778,597 | 12/1973 | Vanderpool et al. |
| 3,882,301 | 5/1975 | Nassimbene ............... 235/466 X |
| 4,025,442 | 5/1977 | Cass. |

OTHER PUBLICATIONS

Le Nouvel Automatisme, vol. 30, No. 52, Mar. 1985, Paris, pp. 45–51, D. Mansion 'Les Codes Barres'.

*Primary Examiner*—Davis L. Willis
*Assistant Examiner*—Edward H. Sikorski
*Attorney, Agent, or Firm*—Lawrence D. Cutter

[57] ABSTRACT

A single width bar code is appended with an end mark which includes a blank interval and a bar. The resulting bar code is bidirectional and inherently self clocking so as to be particularly useful in the identification of semiconductor wafers in very large scale integrated circuit manufacturing processes. The codes described are robust, reliable, and highly readable even in the face of relatively high variations in scanning speed. The codes are also desirably dense in terms of character representations per linear measurements, an important consideration in semiconductor manufacturing wherein space on chips and wafers is at a premium. Additionally, a preferred embodiment of the present invention exhibits a minimum number for the maximum number of spaces between adjacent bars in code symbol sequences.

6 Claims, 6 Drawing Sheets

FIG. 1 CHARACTER FONT BAR PATTERNS CODE BC412
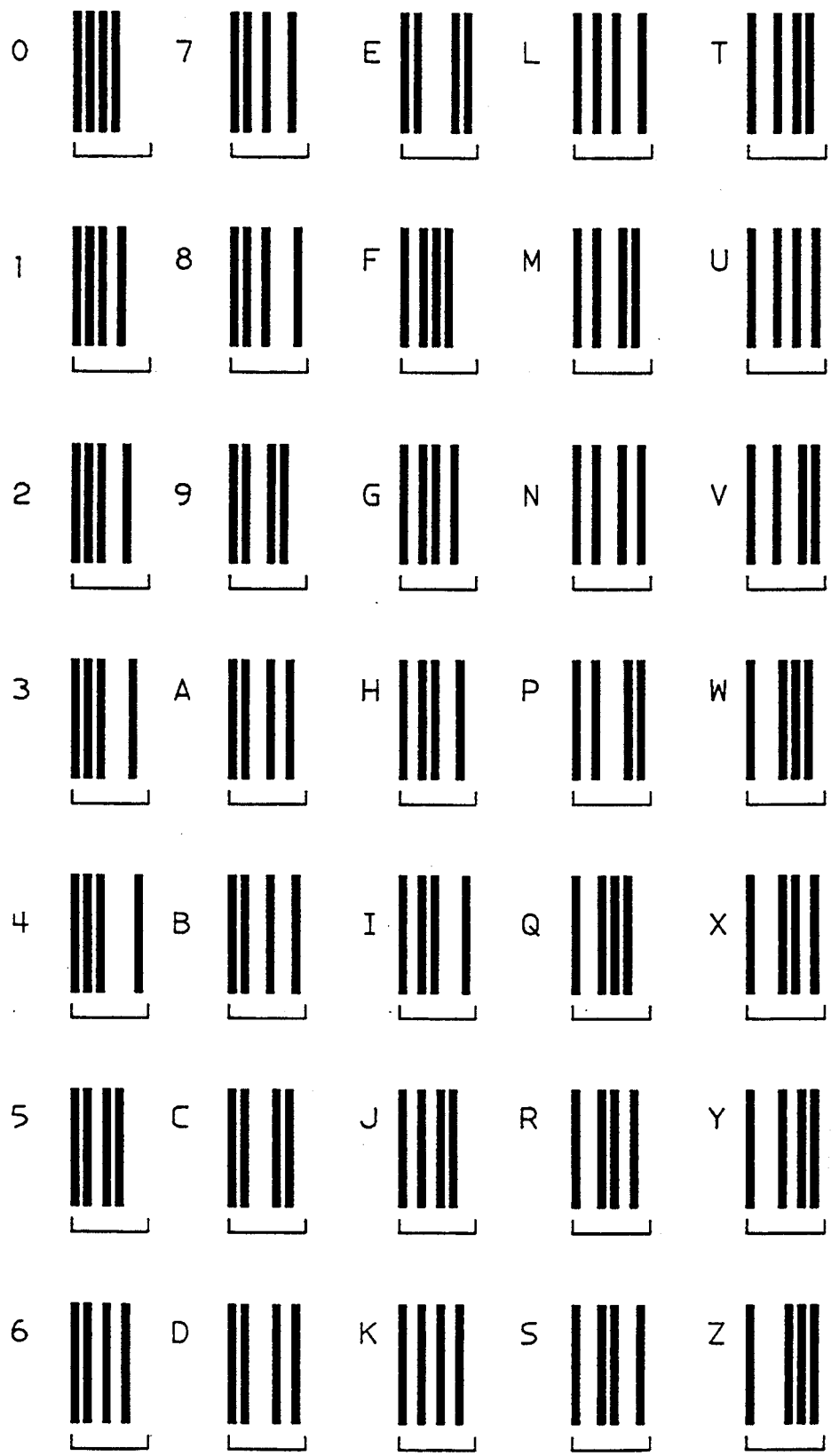

FIG.2A

VARIOUS SINGLE WIDTH BAR CODES

| CHARACTER | BC412 | BC313 |
|---|---|---|
| 0 | I-I-I-I----- | I-I-I-------- |
| 1 | I-I-I--I---- | I-I--I------- |
| 2 | I-I-I---I--- | I-I---I------ |
| 3 | I-I-I----I-- | I-I----I----- |
| 4 | I-I-I-----I- | I-I-----I---- |
| 5 | I-I--I-I---- | I-I------I--- |
| 6 | I-I--I--I--- | I-I-------I-- |
| 7 | I-I--I---I-- | I-I--------I- |
| 8 | I-I--I----I- | I--I-I------- |
| 9 | I-I---I-I--- | I--I--I------ |
| A | I-I---I--I-- | I--I---I----- |
| B | I-I---I---I- | I--I----I---- |
| C | I-I----I-I-- | I--I-----I--- |
| D | I-I----I--I- | I--I------I-- |
| E | I-I-----I-I- | I--I-------I- |
| F | I--I-I-I---- | I---I-I------ |
| G | I--I-I--I--- | I---I--I----- |
| H | I--I-I---I-- | I---I---I---- |
| I | I--I-I----I- | I---I----I--- |
| J | I--I--I-I--- | I---I-----I-- |
| K | I--I--I--I-- | I---I------I- |
| L | I--I--I---I- | I----I-I----- |
| M | I--I---I-I-- | I----I--I---- |
| N | I--I---I--I- | I----I---I--- |
| O |  | I----I----I-- |
| P | I--I----I-I- | I----I-----I- |
| Q | I---I-I-I--- | I-----I-I---- |
| R | I---I-I--I-- | I-----I--I--- |
| S | I---I-I---I- | I-----I---I-- |
| T | I---I--I-I-- | I-----I----I- |
| U | I---I--I--I- | I------I-I--- |
| V | I---I---I-I- | I------I--I-- |
| W | I----I-I-I-- | I------I---I- |
| X | I----I-I--I- | I-------I-I-- |
| Y | I----I--I-I- | I-------I--I- |
| Z | I-----I-I-I- | I--------I-I- |

FIG.2B
VARIOUS SINGLE WIDTH BAR CODES

| CHARACTER | BC411 | BBC31 | BC311 |
|---|---|---|---|
| 0 | I-I-I-I---- | --------I- | I-I-I----- |
| 1 | I-I-I--I--- | ------I--- | I-I--I----- |
| 2 | I-I-I---I-- | ------I-I- | I-I---I---- |
| 3 | I-I-I----I- | ----I----- | I-I----I--- |
| 4 | I-I--I-I--- | ----I---I- | I-I-----I-- |
| 5 | I-I--I--I-- | ----I-I--- | I-I------I- |
| 6 | I-I--I---I- | ----I-I-I- | I--I-I----- |
| 7 | I-I---I-I-- | --I------- | I--I--I---- |
| 8 | I-I---I--I- | --I-----I- | I--I---I--- |
| 9 | I-I----I-I- | --I---I--- | I--I----I-- |
| A | I--I-I-I--- | --I---I-I- | I--I-----I- |
| B | I--I-I--I-- |  | I---I-I---- |
| C | I--I-I---I- | --I-I----- | I---I--I--- |
| D | I--I--I-I-- | --I-I---I- | I---I---I-- |
| E | I--I--I--I- | --I-I-I--- | I---I----I- |
| F | I--I---I-I- | --I-I-I-I- | I----I-I--- |
| G | I---I-I-I-- | I--------- | I----I--I-- |
| H | I---I-I--I- | I-------I- | I----I---I- |
| I | I---I--I-I- |  | I-----I-I-- |
| J | I----I-I-I- | I-----I--- | I-----I--I- |
| K | -I-I-I-I--- | I-----I-I- | I------I-I- |
| L | -I-I-I--I-- | I---I----- | -I-I-I----- |
| M | -I-I-I---I- | I---I---I- | -I-I--I---- |
| N | -I-I--I-I-- |  | -I-I---I--- |
| O |  |  | -I-I----I-- |
| P | -I-I--I--I- | I---I-I--- | -I-I-----I- |
| Q | -I-I---I-I- | I---I-I-I- | -I--I-I---- |
| R | -I--I-I-I-- | I-I------- | -I--I--I--- |
| S | -I--I-I--I- | I-I-----I- | -I--I---I-- |
| T | -I--I--I-I- | I-I---I--- | -I--I----I- |
| U | -I---I-I-I- | I-I---I-I- | -I---I-I--- |
| V | --I-I-I-I-- |  | -I---I--I-- |
| W | --I-I-I--I- | I-I-I----- | -I---I---I- |
| X | --I-I--I-I- | I-I-I---I- | -I----I-I-- |
| Y | --I--I-I-I- | I-I-I-I--- | -I----I--I- |
| Z | ---I-I-I-I- | I-I-I-I-I- | -I-----I-I- |

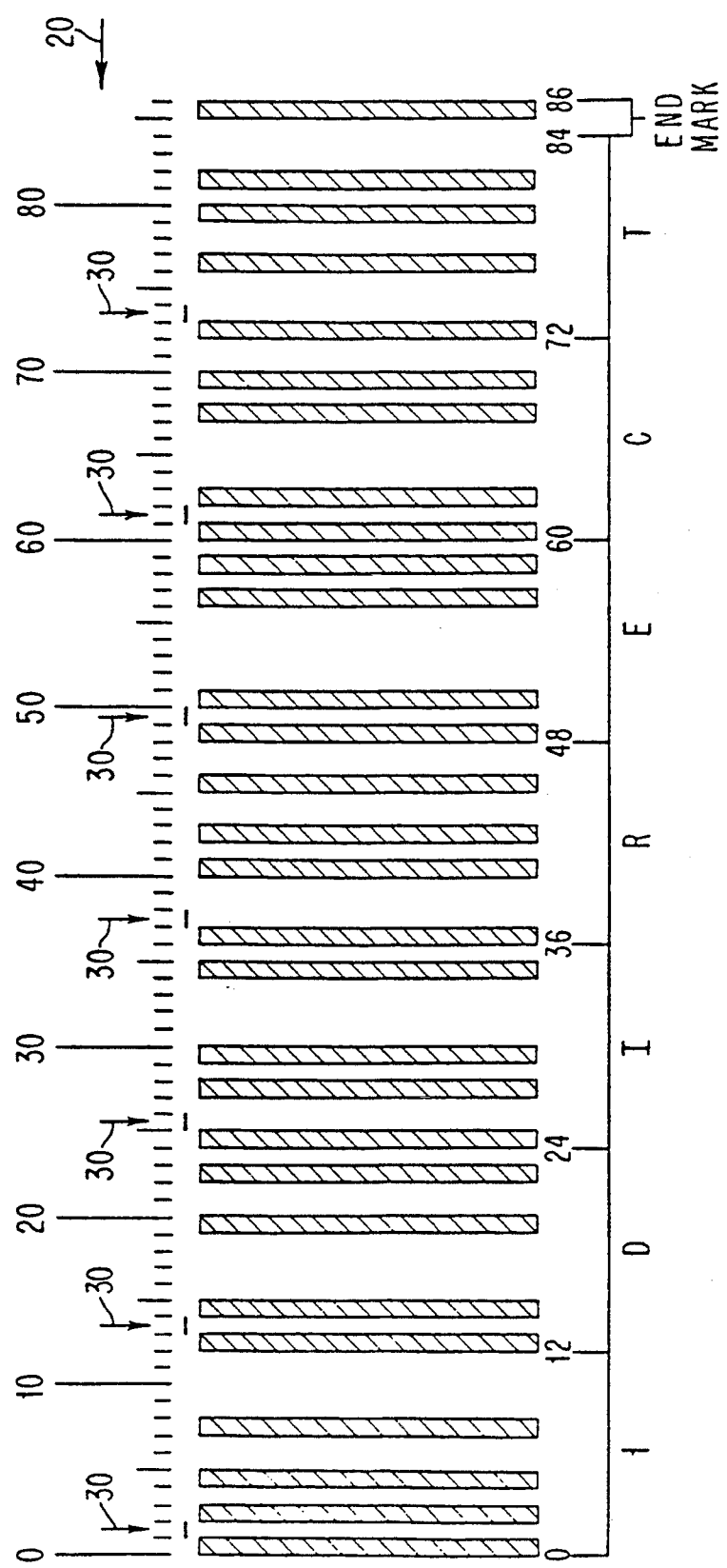

FIG.3A
BARCODE MARKS (ACID ETCH)
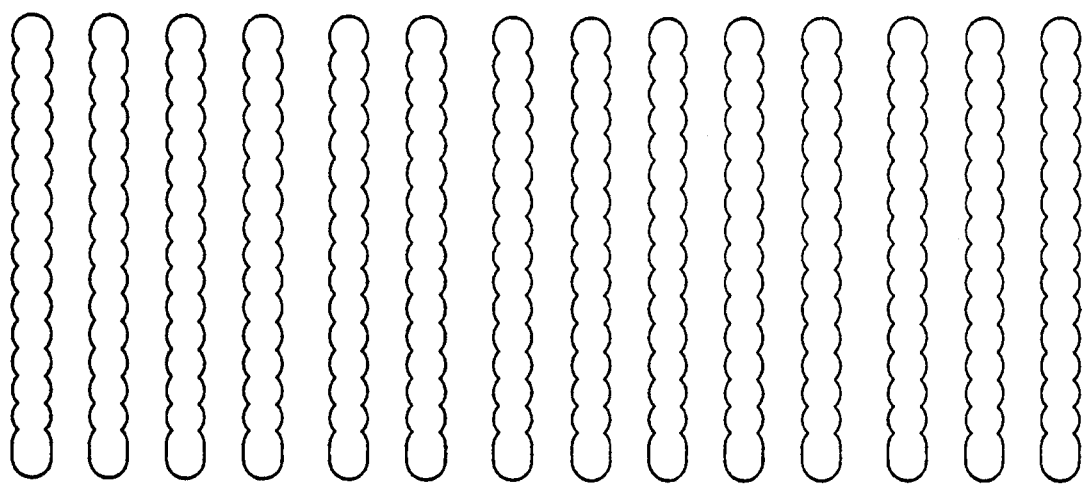
FIG.3B  BARCODE MARKS (ALKALINE ETCH)
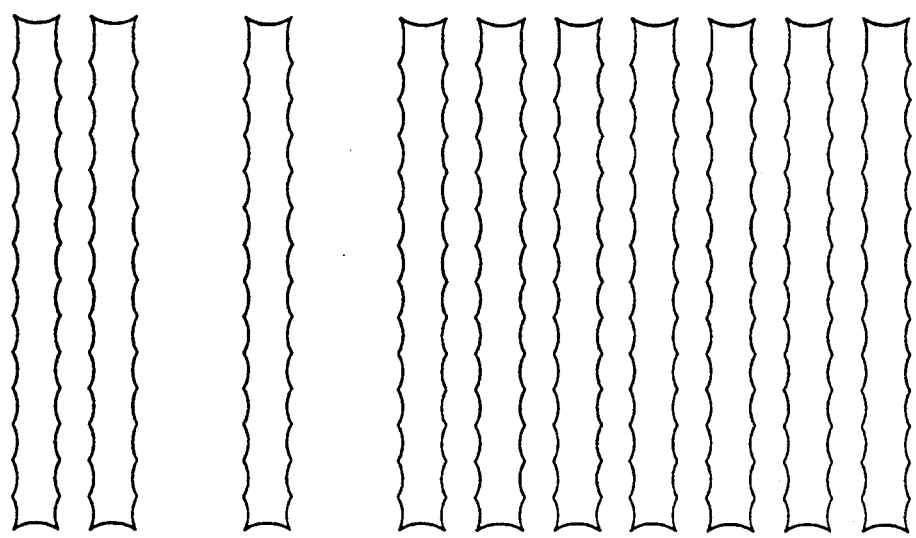

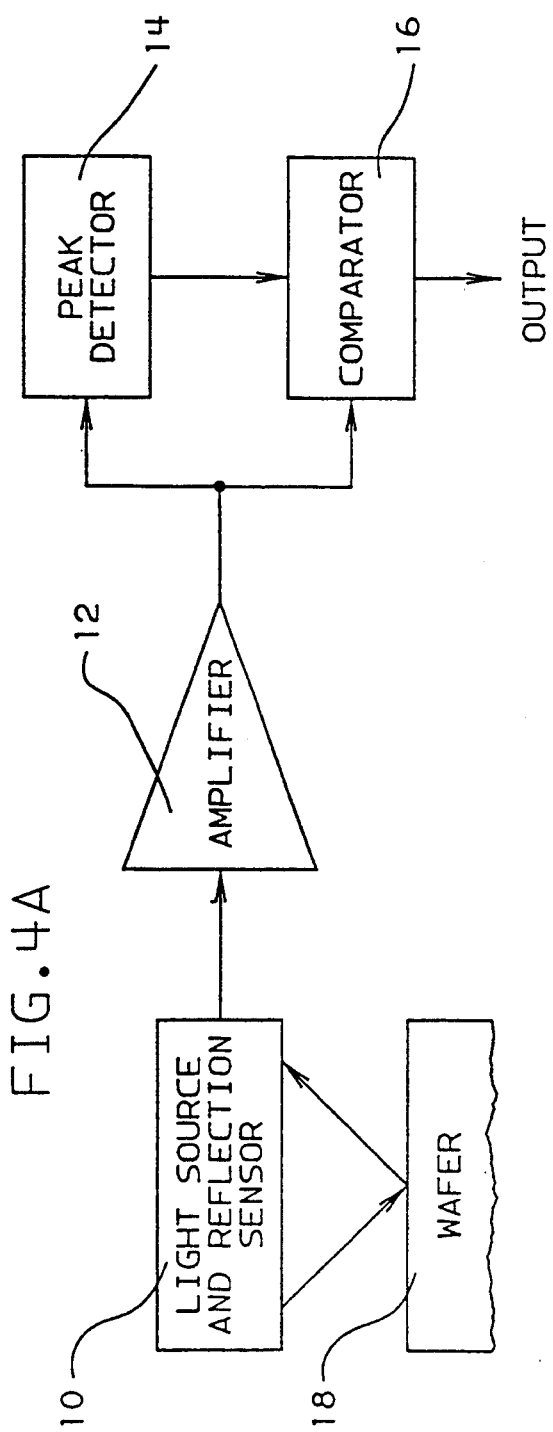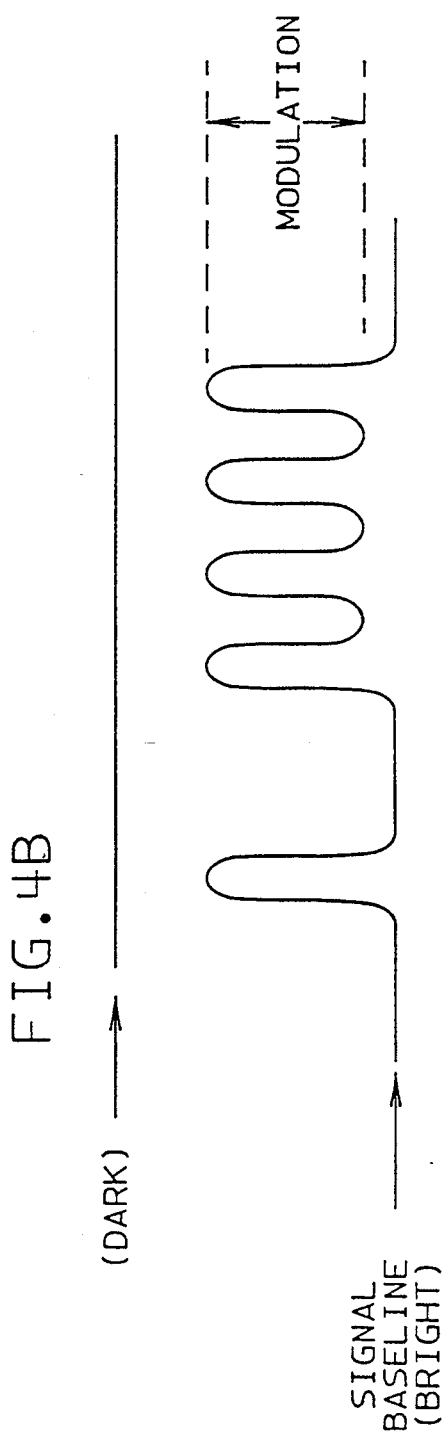

SINGLE WIDTH BAR CODE WITH END CODE PROVIDING BIDIRECTIONALITY

This is a continuation of copending application(s) Ser. No. 07/568,302 filed on Aug. 15, 1990, now abandoned.

BACKGROUND OF THE INVENTION

The present invention is generally directed to bar code configurations which are useful for representing alphanumeric data. More particularly, the present invention is directed to bar codes in which the bars exhibit uniform single width dimensions and specific periodicity and which are ceded to include a subsequence of timing marks to enhance readability and which include a compact end mark to provide bidirectional reading capabilities. The present invention is particularly useful as a high density bar code system which is employable during the manufacture and processing of semiconductor wafers used in the fabrication of electronic circuit chips, such as those that are produced in very large scale integrated (VLSI) circuit manufacturing processes. However, the present bar code is also usable in general process automation application wherever compact and/or robust codes are desired.

Bar code fonts for representing symbol data, particularly alphanumeric symbols, are very desirable since they provide a mechanism for machine readability which does not depend upon optical character recognition (OCR) systems. In general OCR systems tend to be more error prone than bar code systems. However, bar code systems are nonetheless susceptible to certain error conditions. One example of this is the partial covering of the bar code with opaque films or the reducing of the contrast ratio which makes it more difficult to distinguish between wide and narrow width bars. As an example, if the scanning speed in a bar code reader is not absolutely constant, a long gap of spaces between bars is more likely to produce a reading error. Bar codes which have a large number of blank spaces between bars are particularly subject to this kind of error. For example, in certain bar codes a 3% speed variation is sufficient to produce reading errors. Accordingly, it is seen that it is desirable to be able to construct bar code systems in which there is a significant reduction in sensitivity to scanning speed variation.

A number of bar codes employ bars having a plurality of different (modulated) widths. However, there are certain disadvantages associated with multi-width bar code fonts. In particular, their density, for example as measured in characters per inch, is not as high as one could obtain in a font which only exhibited a single width bar. Furthermore, in bar code systems employing multiple bar widths, it is necessary that the circuitry discern each bar's width or at least the width ratio between bars. Modulated bar widths also introduce writing problems when scribing is carried out with a pulsed laser to form the image. Wide bars, that is, bars with widths greater than the width of a laser spot, yield a lower quality bar image and require a much longer writing time. For this reason, modulated bar width codes also pose a greater risk of damage to the wafer because of the increased laser radiation concentration. Furthermore, when pulsed lasers are used to write on semiconductor wafers in dot matrix fashion, there is a tendency for a trench to form which throws off the laser used for reading the imparted signal. Thus, modulated bar width systems tend to introduce readability problems when there is a writing quality problem, bar image degradation or low contrast such as might occur in the identification of semiconductor wafer serial numbers.

Single width bar codes are employed but require the simultaneous use of separate timing marks. The single width bar codes therefore require twice the space, plus dual readers. A typical example of such a code is found on certain envelopes as coded by the United States Postal Service. Dual readers are not only more expensive, but the code that they employ takes up more room on a wafer. This room is much more advantageously given over to a human readable version of the code.

While the present invention is generally directed to bar code reading systems having a wide range of applicability to process automation, manufacturing, marketing, sorting and identification functions, it is particularly applicable to the identification of semiconductor wafers. In particular, in the manufacture of very large scale integrated circuit devices, that is, chips produced from processed wafers of material such as silicon, it is necessary to employ a code that can be efficiently written and which is robust under the exigencies of processing in unusually harsh environments. Such codes are required to be robust and satisfy the need for representing the full range of alphanumeric characters, A through Z and 0 through 9. This set constitutes a total of 36 characters. However, the letter "O" is often deleted from the required set having a total of 35 characters which usually need to be represented and/or distinguished. Additionally, because of size constraints that exist in the manufacture of semiconductor devices it is very desirable that codes employed exhibit a high density. Thus codes which require a separate set of timing marks are undesirable because of the space that the timing marks require.

Furthermore, codes which are suitable for semiconductor chip processing generally should be easy to write on a wafer during processing and should likewise be easily read during wafer or chip processing. Furthermore, the bar code font employed should be such that it is able to withstand processing conditions, namely exposure to sometimes harsh chemicals and high temperature environments. Furthermore, it is desirable to employ codes which can be written by means of a pulsed laser. Such robust and highly reliable codes are desired for wafer fabrication processes to facilitate automatic wafer handling, processing and process parameter identification. Furthermore, it would also be desirable to have a bar code which could be scanned in both directions with some mechanism of assuring that the code read backwards would not result in valid symbol interpretation. Furthermore, it is seen that codes that are developed for such processes would also possess a wide range of applicability in other areas in which bar codes are presently employed.

SUMMARY OF THE INVENTION

In accordance with a preferred embodiment of the present invention a method for marking a substrate with a bar code comprises the step of providing a sequence of uniform width marks at selectively spaced intervals. Each of the marks possesses substantially the same width, with blank intervals between the marks. The blank intervals have a width which is substantially equal to an integral multiple of a second width which represents the width of a single blank space. More particularly, the present invention employs a brief end mark to identify the code as being directional in the sense that a backward scan of the code provides an indication that invalid code symbols would result if interpreted in this direction. Nonetheless, the method of the present invention employs a single width bar.

Furthermore, in accordance with the present invention, the sequence of marks is such that it includes a subsequence which is spaced apart from adjacent marks in the subsequence by a fixed distance. This provides a means for timing recovery and/or timing compensation. In accordance with a particular embodiment of the present invention each character or symbol is represented by a sequence of 12 marks and/or spaces. This permits the representation of up to 35 or 36 different symbols which is sufficient for alphanumeric representation. Furthermore, the present invention preferably employs bar codes in which the marks are spaced to represent a number of different symbols in such a way that the largest distance between adjacent bars for different symbols is a minimum. In a preferred embodiment of applicants' invention this minimum distance is five bar widths. This latter feature of the invention reduces the occurrence of sequences of symbols in which wide gaps having no bars are produced. Additionally, the present invention is also directed to a substrate marked in accordance with the method described above and includes substrates having such identification marks thereon.

Accordingly, it is an object of the present invention to provide a high density bidirectional bar code system, as measured for example in terms of characters per centimeter.

It is a still further object of this invention to extend a unidirectional bar code so that it can nonetheless be read or scanned in either direction by providing an indication of proper direction.

It is also an object of the present invention to provide a high density bar code which is particularly suitable for use in the identification of wafers and/or chips in semiconductor manufacturing processes.

It is yet another object of the present invention to devise a single width, self clocking bar code which is both robust and reliable.

It is a still further object of the present invention to provide bar codes which are employable in harsh environments and which can be readily written on materials employed in semiconductor manufacture generally and in particular on materials such as silicon.

It is still another object of the present invention to provide bar code systems which exhibit single width bars and yet are self clocking.

It is also an object of the present invention to provide a bar code which exhibits a minimum distance value from amongst all of the largest distances between adjacent bars in sequences of different symbols.

It is a still further object of the present invention to provide a bar code system which is capable of representing up to 35 or 36 different symbols, such as the 36 alphanumeric symbols A through Z and 0 through 9.

Lastly, but not limited hereto, it is an object of the present invention to provide an easily read and easily written bar code having universal applicability to product identification.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 illustrates a bar code system which is preferred in the present invention;

FIG. 2A is an illustration of two single width bar codes with built-in timing marks, in accordance with the present invention;

FIG. 2B is an illustration of three single width bar codes without built-in timing marks;

FIG. 2C is an enlarged illustration of the BC412 bar code shown in FIGS. 1 and 2A and more particularly showing the inclusion of an end mark which provides the code with characteristics not normally possessed by unidirectional codes.

FIG. 3A is a planar view of acid etched bar code marks on a semiconductor substrate;

FIG. 3B is a view similar to FIG. 3A except illustrating the utilization of an alkaline etch;

FIG. 4A is an illustration of a system which is capable of reading codes produced in accordance with the present invention;

FIG. 4B is an illustration of signals produced in accordance with the present invention by means of the bar code reading system illustrated in FIG. 4A.

DETAILED DESCRIPTION OF THE INVENTION

FIG. 1 illustrates a preferred embodiment of the present invention. In particular, FIG. 1 illustrates a presence/absence single width bar code which is capable of representing the numeric digits 0 through 9 and the alphabetic characters A through Z (without the character "0"). This particular code is therefore seen to be able to represent 35 distinct symbols. The flattened U-shaped channel mark at the bottom of each of the bar code symbols is shown only for convenience to point out the fixed distance that each set of bar code symbols occupies. In particular, it is to be noted that each code symbol character occupies the same horizontal distance and is made up of a plurality of single width vertical bars and correspondingly sized spaces between these bars. Furthermore, when compounded together in a sequence of alphanumeric characters, it is seen that the first bar in each code forms part of a subsequence of bars which is capable of providing timing information. Other aspects of the bar code shown in FIG. 1, and designated herein as BC412, are more particularly discussed below in comparison with other single width bar codes.

In particular, consideration is now directed to FIGS. 2A and 2B which illustrate a variety of single width bar codes including code BC412 discussed above. In particular, FIGS. 2A and 2B illustrate the presence of a bar in the code in the form of the letter "I". Spaces or absences of bars are illustrated by hyphens, "-". In particular, it is noted that code BC412 shown in FIG. 2A always begins with a "I-" sequence. In this case, these two code symbols constitute two elements of a subsequence which is repeated in any concatenation of bar code symbols. In code BC412 it is seen that the total number of code elements is 12 so as to make this particular code one which is of fixed length. Furthermore, amongst these 12 slots (elements) where bars could be present or absent there are always a total of 4 bars per alphanumeric character, a fact which is again helpful in establishing or reestablishing timing control. Correspondingly, each symbol includes a total of 8 spaces (bar absences) per character symbol. Code BC412 is thus seen to be capable of representing 35 characters which is sufficient for most alphanumeric applications. Most importantly for code BC412, the maximum number of spaces between bars in any concatenated sequence of code symbols is 5. This means that there are no long runs of blank spaces between adjacent bars. This significantly improves the readability and reliability of such bar codes. There is also a minimum of one space between bars. Therefore the first and last elements a bar and space, respectively. In particular, it is seen that bar codes in which the maximum number of spaces between bars is a minimum is preferred for purposes of controlling sensitivity to speed variation in the reading device. The reason for this is that when a reading device reads the bar/space sequence, the device detects the presence of bars, and derives the number of spaces between the bars from the scanning speed and time. If the scanning speed is not absolutely constant, a long gap of spaces between bars is more susceptible to the production of reading errors. An example of this is the BBC31 code, as seen in FIG. 2B, having up to 17 spaces between bars. A code such as this is subject to reading errors at a mere 3% speed variation. In contrast however the BC412 code, with only a maximum of 5 spaces between bars is capable of readability even at an 8% variation in speed. This is a significant advantage for the BC412 code.

Another bar code in accordance with the present invention is illustrated by the code labeled BC313 in FIG. 2A. For the same reasons given above with respect to code BC412, code BC313 is also seen to possess timing indicia which are inherent in the code structure. Thus codes such as BC412 and BC313, as shown, do not require the presence of a separate set of timing marks. Code BC313 however possesses one more element per symbol than code BC412. Nonetheless it is fully capable of representing a full alphanumeric character set of 36 different symbols. Code BC313 is seen to include a total of three bars per character and a total of 10 spaces per character. Additionally, the maximum number of spaces between bars is 8 which is higher than the corresponding maximum distance for code BC412. Nonetheless both codes BC412 and BC313 represent single width bar codes with built-in timing recovery subsequences. It is further seen that codes BC412 and BC313 each possess sufficient inherent and discernible structure so as to readily permit their extension to codes where the number of elements per character represented is greater than twelve.

FIG. 2B also illustrates several other single width bar codes namely code BC411, code BBC31 and code BC311. While these are all illustrations of single width bar codes, it is seen that they do not possess the desired self clocking feature. Furthermore, code BBC31 appears to be particularly lacking in the range of different symbols it is capable of representing namely 31, as opposed to 35 or 36. The attributes of the various codes shown in FIGS. 2A and 2B are listed below in Table I:

TABLE I

|  | BC411 | BC412 | BBC31 | BC311 | BC313 |
| --- | --- | --- | --- | --- | --- |
| # of elements | 11 | 12 | 10 | 11 | 13 |
| # Bars/Character | 4 | 4 | 1 to 5 | 3 | 3 |
| # Spaces/Character | 7 | 8 | 5 to 9 | 8 | 10 |
| Max. # Spaces between bars | 7 | 5 | 17 | 7 | 8 |
| Timing Bar | No | Yes | No | No | Yes |
| # Characters | 35 | 35 | 31 | 36 | 36 |

It is to be particularly noted that among the four codes in Table I that have a fixed number of bars, code BC412 has the least number for the maximum number of spaces between bars, that is, five spaces. This is a highly desirable characteristic as noted above. It is also seen that codes such as BBC31 do not even possess the desirable property of having a fixed number of bars or spaces per symbol character represented.

In one implementation of the BC412 bar code shown in FIG. 1, a semiconductor wafer identifier consists of seven characters one of which is a check sum character. The seven character identifier is encoded into the appropriate bar code sequence according to the BC412 code definition. In addition, a bar is appended at the end of the encoded sequence. In reading this resulting bar code, every twelfth element starting from the first of the bar/space sequences is a bar and is recognized as the beginning of a character. A wafer reference notch is used to orient the direction of the encoded bar/space sequence. Without the reference notch however, this particular encoded sequence may in fact be read backward and be recognized as a legitimate, but incorrect, wafer identifier. That is, as seen in FIG. 1, the BC412 code is a unidirectional bar code.

However, it is possible to change this aspect of the BC412 code simply by appending a space and a bar instead of a bar only as the ending pattern for the encoded sequence of characters. In particular, in this case when the sequence is read backward (in the direction shown by arrow 20), the thirteenth element encountered is a space. That is, every character except possibly the first would be an illegitimate character because it begins with a space instead of a required bar. This is illustrated in FIG. 2C. The bar code version of the characters "1DIRECT" is shown therein. In particular, it is seen that when this bar code pattern is scanned in the direction shown by arrow 20, every twelfth slot after the first bar, as indicated by arrows 30, contains a space rather than a bar. It is thus seen that an end mark comprising a space and a bar is sufficient to render the BC412 code readable in both directions in the following sense. In particular, it can be determined from the bar/space sequence pattern that the code is being read backwards. In this instance, it is a simple matter to reverse the bit pattern representing the code symbols so as to produce the signals in the appropriate (reversed) sequence. In this fashion, the BC412 code with end mark is readily seen to be scannable in both directions.

However, even though the BC412 code described above with an end mark is scannable in both directions, there are yet other circumstances which can occur during scan operations which make it desirable to modify the BC412 code even further. In particular, during scan operations, it is possible to perform a diagonal scan of a bar code in such a way that the scanning operation begins in the middle of the bar code in which case a first segment of bar code elements is entirely missed. Additionally, it is also possible to perform diagonal scans of bar codes in such a way that a first segment of bar code elements is recognized but in which the angle of the scan is so different than the direction perpendicular to the bars that end segments of the bar code are not read at all. Other situations other than diagonal scanning can also result in incomplete data collection. In such circumstances it is desirable to be able to specifically identify not only an end mark for the bar code but also to be able to identify a start indicator. Thus, bar codes which possess both start and stop marks or indicators can be made immune to the diagonal scan problem or at least provide an indication that an incomplete number of bar code elements have been scanned. Accordingly, it has been found desirable to modify the BC412 code even further to provide (in circumstances which warrant it) both start and stop bar code indications. Thus, a major advantage of start and stop bar code indicators is that a variable number of symbols is easily represented by the bar code in the face of diagonal scan and symbol drop cut problems.

Furthermore as pointed out above, it is often desirable to also have bar codes which possess the bidirectionality property. However, extra start and stop bar code elements increase the length or size of the code. In applications involving the marking of semiconductor devices, it is seen that it is generally not desirable to employ any more bar code elements than is necessary because of the desire to reduce the amount of device real estate consumed by identification indicia. Thus one would like to be able to satisfy the conflicting goals of having a small number of elements involved in start and stop indicia yet have sufficient capability to provide (where desirable) both bidirectionality and variable length.

Accordingly, Table II below is provided as an options chart or selection space layout for describing thirteen different variations that are available for start and stop symbols. Following the schema laid out in FIGS. 2A and 2B, the letter "I" represents a bar and the hyphen, "-", represents a space. Table II is seen to provide thirteen different variations for start symbols and corresponding stop symbols. Table II also indicates which of these thirteen start and stop symbol sets provide bidirectionality and variable length coding for the BC412 code shown in FIGS. 1 and 2A. Also shown in Table II, is the additional number of bar code elements that the inclusion of each set of start and stop characters would require. Since these are additional bar code elements that are not otherwise present, their introduction into the BC412 coding schema produces a certain overhead in terms of space utilization. This overhead is shown as a percentage in the rightmost column of Table II. In particular, the percentage shown is based upon the increase in the number of bar code elements over a seven symbol BC412 message set such as that shown in FIG. 2C. However, note that in terms of the percentage calculation the last two bar code elements shown in FIG. 2C are in fact considered part of the overhead used in calculating the percentages shown in Table II.

Since it is often desirable to have both bidirectionality and variable length as bar code features, and since it is likewise desirable to employ bar code schemas exhibiting the least amount of overhead, it is seen that Option 7 shown in Table II is the first code listed that provides certain ones of the desired feature capabilities while at the same time employing the least amount of overhead (that is, space or chip real estate). Accordingly, Option 7 is one of the preferred choices for providing both bidirectionality and variable length in bar codes constructed in accordance with the present invention.

Thus, a start symbol "I-I - - - " may be effectively employed in conjunction with the BC412 code as part of a schema which provides both bidirectionality and variable length features. Furthermore, as above, the bar code element sequence "-I" (readable as "space bar") is preferably employed as a stop or end mark.

TABLE II

| Option | Start | Stop | No. of Elem. | Bidir. | Var. Length | Over- Head |
| --- | --- | --- | --- | --- | --- | --- |
| 1 | | I | 1 | No | No | 1.2% |
| 2 | | -I | 2 | Yes | No | 2.4% |
| 3 | I- | I-I | 6 | Yes | No | 7.1% |
| 4 | I------ | I | 8 | Yes | No | 9.5% |
| 5 | I------ | -I | 9 | No | Yes | 10.7% |
| 6 | I------ | I-I | 10 | Yes | No | 11.9% |
| 7 | I-I------ | -I | 11 | Yes | Yes | 13.1% |
| 8 | I-I----I- | -I | 14 | Yes | Yes | 16.7% |
| 9 | I-I-I-I-I-I- | -I | 16 | Yes | Yes | 19.0% |
| 10 | I------- | -I | 10 | Yes | Yes | 11.9% |
| 11 | I-------- | -I | 11 | Yes | Yes | 13.1% |
| 12 | I-I------- | -I | 12 | Yes | Yes | 14.2% |
| 13 | I--I------ | -I | 12 | Yes | Yes | 14.3% |

Note too that in terms of the smallest overhead shown, the bar code of Option 10 results in an overhead of only 11.9%, while also providing the bidirectionality feature and the variable length feature. However, with seven consecutive spaces in a row, this code is also somewhat more sensitive to scanning speed variations. It is thus seen how hard it is to optimize against all criteria at the same time: bidirectionality, variable length and lack of sensitivity to scanning speed variations.

To more fully understand preferable variation selection, consider two cases one having two subcases. In the first instance, suppose that bidirectionality and fixed lengths were acceptable choices (case 1). If there is no start character (set of bar code elements) and "-I" is the end mark, Option 2 is preferred since little space is required. In the second instance suppose that bidirectionality and variable length are both desired features (case 2). Then if space requirements have importance (subcase 1), Option 10 is preferred. On the other hand, if reduced dependence on scanning velocity is the goal (subcase 2), then the use of "I-I - - - " as a start character (or mark) and "I-I" as an end character is preferred. Note that this latter choice is not specifically shown in Table II illustrating the point that Table II provides a mechanism for picking and choosing a range of start and stop characters in an independent fashion without necessarily departing at all severely from the design goals of the BC412 code.

FIG. 2C is also useful for displaying the overall single width aspect of the codes of the present invention. The figure is useful too for illustrating the twelve "slots" that are present for the BC412 code. This figure also shows the simplicity of the end mark. (Hatch marks are employed in FIG. 2C not to indicate a cross section but rather to avoid large filled-in drawing areas.)

The system of the present invention is particularly applicable to the marking of semiconductor materials for identification during processing. The application of single width character fonts provides a higher code density, simpler writing methods plus easier reading because the reading system only has to recognize the presence or absence of a bar, without having to discern the bar's width or the width ratio between bars. As applied to silicon wafers, the bar widths are typically between about 0.10 millimeters and 0.05 millimeters for pre-polish mark and post-polish mark writing methods respectively with code densities from 12 to 6 characters per centimeter. Higher densities are possible be writing narrower bars which are read by higher resolution readers. In one embodiment of the present invention, bars having a width of 4 mils are employed. Such bars are disposed at a 10 mil center to center spacing leaving a minimum width between adjacent bars of 6 mils. For these dimensions, the bar width is 4 mils and the space width is 6 mils.

The marks are preferably written into the semiconductor substrate by means of a switched Nd:YAG laser operating in dot matrix mode. High quality bars are produced on silicon wafers with non-overlapping dots. Etching plus chemical and mechanical polishing operations transform the marks into more continuous lines.

As indicated above, it is highly desirable for the bar code indicia of the present invention to be able to withstand the harsh environments of VLSI processing methodologies. Temporary process overlays can obstruct part of the bar code and/or reduce the contrast ratio thus producing difficult bar code reading situations. FIGS. 3A and 3B clearly indicate that the codes of the present system, when written on silicon semiconductor material, are capable of surviving exposure to both acidic and alkaline chemicals.

Next is considered a system which is capable of reading such marks placed on a wafer or similar substrate. In particular, attention is directed to FIG. 4A wherein it is seen that light source and reflection sensor 10 is capable of directing a source of light, preferably laser light, on to the substrate of wafer 18. The light reflected from wafer 18 is received by the sensor in functional block 10 thus producing an electrical signal such as that shown in FIG. 4B. This signal is amplified by means of amplifier 12 and sent to both peak detector 14 and comparator 16 which produces the desired binary output which is indicative of the concatenated string of characters appearing on wafer 18 in the form of a bar code such as BC412 or BC313.

From the above, it should be appreciated that the bar code system of the present invention is fully capable of satisfying the objects set out herein. In particular, it is seen that the present invention provides a single width, bidirectional bar code exhibiting inherent self clocking characteristics. Furthermore, it is seen that the codes herein provide for the full range of representation for the alphanumeric character set. Additionally, it is seen that the preferred code herein exhibits a minimum value for the maximum number of spaces occurring between bars. It is further noted that while the codes described specifically herein exhibit an inherent timing subsequence arising out of the leading code bars, that it is also possible to produce codes wherein the subsequence of timing marks occurs either in the middle of the code or in a trailing sequence. Either of these arrangements are possible while still keeping within the spirit of the present invention. Additionally, while the invention herein has been described specifically with reference to the processing of semiconductor wafers and/or chips, it should be noted that the system disclosed herein is generally applicable in whatever systems employ bar codes generally. More particularly, as used herein and in the appended claims, the term "substrate" is not limited to semiconductor materials. A substrate may be paper, such as an adhesively backed label, wood, metal, plastic, compositive or other material capable of being marked or of receiving marking indicia on a portion of its surface. The marking may be provided by ink or by altering surface properties or other physical properties of the material, including but not limited to electrical and/or magnetic properties and accordingly the term "mark" should not be construed as being limited to a visible mark.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for marking a substrate with a bar code, said method comprising the step of:
providing adjacently positioned groups of sequences of marks, said groups including four substantially uniformly wide marks of a first width, $W_1$, at selectively spaced intervals within said groups, and also including an equal number of blank intervals within each of said groups, said individual blank intervals having a plurality of different widths which are integral multiples of a second width, $W_2$, and wherein in at least one group there is a blank interval which has a width which is three times said second width, said groups thus being such that each group has a width substantially equal to $(4W_1 + 8W_2)$ and wherein said groups include an end mark in the form of a single width blank interval followed by a mark at the end of said groups of sequences.

2. The method of claim 1 in which said substantially uniformly wide marks are spaced to represent up to 35 different symbols.

3. The method of claim 1 in which said substantially uniformly wide marks are spaced to represent a plurality of distinct symbols in such a way that the largest distance between adjacent bars for different symbols is $5W_1$.

4. A substrate having identifying information comprising adjacently positioned groups of sequences of marks, said groups including four substantially uniformly wide marks of a first width, $W_1$, at selectively spaced intervals within said groups, and also including an equal number of blank intervals within each of said groups, said individual blank intervals having a plurality of different widths which are integral multiples of a second width, $W_2$, and wherein in at least one group there is a blank interval which has a width which is three times said second width, said groups thus being such that each group has a width substantially equal to $(4W_1 + 8W_2)$ and wherein said groups include an end mark in the form of a single width blank interval followed by a mark at the end of said groups of sequences.

5. The substrate of claim 4 in which said substantially uniformly wide marks are spaced to represent up to 35 different symbols.

6. The substrate of claim 4 in which said substantially uniformly wide marks are spaced to represent a plurality of distinct symbols in such a way that the largest distance between adjacent bars for different symbols is $5W_1$.

* * * * *